United States Patent
Huang et al.

(10) Patent No.: US 10,592,462 B2
(45) Date of Patent: Mar. 17, 2020

(54) CABLE DETECTION

(71) Applicant: QUANTA COMPUTER INC., Taoyuan (TW)

(72) Inventors: Jen-Hsuen Huang, Taoyuan (TW); Fa-Da Lin, Taoyuan (TW); Yi-Ping Lin, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 16/012,015

(22) Filed: Jun. 19, 2018

(65) Prior Publication Data
US 2019/0384740 A1   Dec. 19, 2019

(51) Int. Cl.
*G06F 13/40* (2006.01)
*G06F 13/42* (2006.01)

(52) U.S. Cl.
CPC ........ *G06F 13/4282* (2013.01); *G06F 13/404* (2013.01); *G06F 13/4022* (2013.01); *G06F 13/4081* (2013.01)

(58) Field of Classification Search
CPC ............. G06F 13/4282; G06F 13/4022; G06F 13/4081; G06F 13/404
See application file for complete search history.

(56) References Cited

U.S. PATENT DOCUMENTS

| | | | | |
|---|---|---|---|---|
| 2015/0311952 | A1* | 10/2015 | Varma | H04L 41/069 455/41.1 |
| 2015/0312086 | A1* | 10/2015 | Terwilliger | H04L 41/0631 455/41.1 |
| 2015/0312087 | A1* | 10/2015 | Terwilliger | H04L 41/5074 455/41.1 |
| 2017/0364375 | A1* | 12/2017 | Ku | G06F 9/44505 |
| 2019/0121770 | A1* | 4/2019 | Chang | G06F 13/404 |

* cited by examiner

*Primary Examiner* — Ernest Unelus
(74) *Attorney, Agent, or Firm* — Nixon Peabody LLP; Zhou Lu

(57) ABSTRACT

A computing device configured to detect proper cable assembly to improve assembly and problem diagnosis is provided. The computing device includes a motherboard, a function board, and a middle plane connecting the motherboard and function board. The motherboard includes a baseboard management controller (BMC). The BMC is connected to I²C buses. The function board includes integrated circuits. The middle plane includes cable connections interconnecting the I²C buses that are connected to the BMC and the integrated circuits. The integrated circuits have unique system addresses that are identifiable by the BMC.

15 Claims, 7 Drawing Sheets

CABLE DETECTION

FIELD OF THE INVENTION

This application relates to a server device and method to detect proper cable assembly to improve assembly and problem diagnosis.

BACKGROUND

In the field of information systems, connecting equipment together is often a daunting task. In some instances, computing equipment are connected by cables via connectors. In other instances, cables are connected to a board having a large number of pins. One example of such a connection is between a computer peripheral and a main or host computer. It is often a challenge to ensure the connector leading from a peripheral component is connected properly to the opposing connector, or to the pins on a board.

Typically, once a system is powered up with an improperly connected component, the main system, such as a personal computer, will not work because the main computer bus has been corrupted. Administrators or system owners may resort to dismantling their equipment to diagnose the problem, or call a customer support line to seek resolution of the problem—both of which are time consuming approaches. Repeated unsuccessful attempts to connect cables can also result in damage to the computer or to a peripheral component, in the form of broken connection pins, improper connections of power supplies to ground, and improper connections of high voltage levels to delicate circuits.

To alleviate such issues, manufacturers typically prepare diagrams illustrating the location for each connector. These diagrams can be quite complex, depending on the size of the system. Also, they do not address the proper orientation of a cable into a connector. Furthermore, this approach can only provide guidance to the user prior to connection. Once a faulty connection is made, the manufacturer provided diagram offers no assistance in rectifying the connection.

Manufacturers also typically use colored coating on a portion of the cable insulation leading up to a connector to prevent incorrect connection. While the color identification can aid the user in correctly identifying a particular pin on the connector, the part to which the connector will be attached, such as a motherboard, may not have color identification to match the connector. As with other conventional methods, this approach only helps the user prior to establishing the connection but does not offer assistance in correcting the connection.

Therefore, there is a need for a system and method for facilitating proper cable connections. Specifically, there is a need for a system and method for identifying proper cable connection, and to provide information to correct an incorrect cable connection.

SUMMARY

The following presents a simplified summary of one or more embodiments in order to provide a basic understanding of present technology. This summary is not an extensive overview of all contemplated embodiments of the present technology, and is intended to neither identify key or critical elements of all examples, nor delineate the scope of any or all aspects of the present technology. Its sole purpose is to present some concepts of one or more examples in a simplified form as a prelude to the more detailed description that is presented later.

A computing device configured to detect proper cable assembly is provided to improve assembly and problem diagnosis. The computing device can include a motherboard, a function board, and a middle plane connecting the motherboard and function board. The motherboard includes a baseboard management controller (BMC). The BMC is connected to Inter-IC ($I^2C$) buses. The function board includes integrated circuits. The middle plane can include cable connections. The cable connections can connect the $I^2C$ buses connected to the BMC and the integrated circuits. The BMC can be configured to verify if the cabling is connected to the intended integrated circuit.

The computing device can also include signal lines connecting the BMC to the $I^2C$ buses. In some implementations, each of the integrated circuits can include a unique address, identifiable by the BMC via the $I^2C$ buses. Furthermore, the BMC and the $I^2C$ buses can be connected via an $I^2C$ switch. The computing device can also include a main $I^2C$ bus connecting the BMC and $I^2C$ switch. In some embodiments of the disclosure, each integrated circuit can have a unique address. The unique address can be identifiable by the BMC via the main $I^2C$ bus.

In another embodiment of the disclosure, the computing device can include multiple motherboards, a function board, and a middle plane connecting each motherboard to the function board. Each of the motherboards can include a BMC and an $I^2C$ bus. The function board can include multiple integrated circuits. The middle plane can include cable connections. The cable connections can connect the $I^2C$ bus connected to the corresponding BMC and the integrated circuits. The BMC can be configured to verify if the cabling is connected to the intended integrated circuit.

In another embodiment of the disclosure, the computing device can include a motherboard, multiple function boards, and a middle plane connecting the motherboard and the multiple function boards. The motherboard can include a BMC. The BMC can be connected to multiple $I^2C$ buses. Each of the function boards can include integrated circuits. The middle plane can include cable connections. The cable connections can connect the $I^2C$ buses connected to the BMC, and the integrated circuits. The BMC can be configured to verify if the cabling is inserted into the intended integrated circuit.

BRIEF DESCRIPTION OF THE DRAWINGS

In order to describe the manner in which the above-recited and other advantages and features of the disclosure can be obtained, a more particular description of the principles described above will be rendered by reference to specific examples illustrated in the appended drawings. These drawings depict only example aspects of the disclosure, and are therefore not to be considered as limiting of its scope The principles are described and explained with additional specificity and detail through the use of the following drawings. The disclosure, and its advantages and drawings, will be better understood from the following description of exemplary embodiments together with reference to the accompanying drawings. These drawings depict only exemplary embodiments, and are therefore not to be considered as limitations on the scope of the various embodiments or claims. The disclosure, and its advantages and drawings, will be better understood from the following description of exemplary embodiments together with reference to the accompanying drawings. These drawings depict only exemplary embodiments, and are therefore not to be considered as limitations on the scope of the various embodiments or claims.

DETAILED DESCRIPTION

Figure 1A:
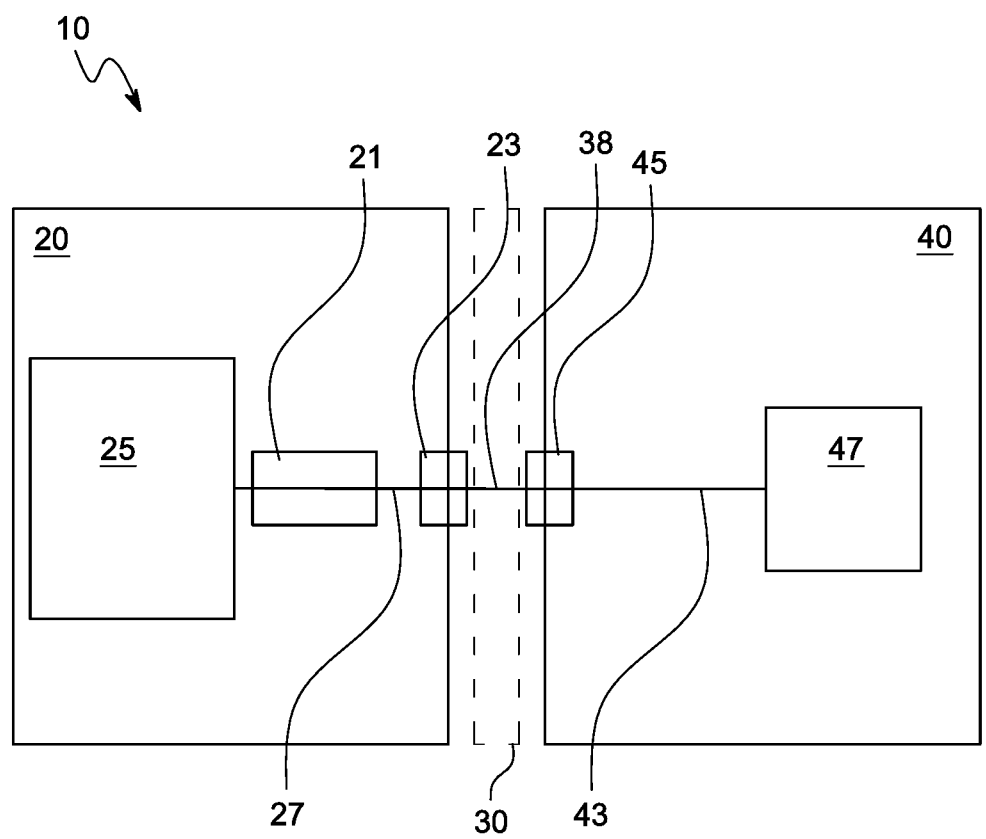
FIG. 1A shows a network system 10 in accordance with one or more embodiments of the disclosure.

The present invention is described with reference to the attached figures, where like reference numerals are used throughout the figures to designate similar or equivalent elements. The figures are not drawn to scale and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

In general, one implementation of the subject matter disclosed herein is directed to a computing device configured to detect proper cable assembly in an effort to improve assembly and problem diagnosis. In one or more embodiments of the disclosure, the computing device includes a motherboard, a function board, and a middle plane connecting the motherboard and function board. The motherboard can include a BMC that serves as a master device. The BMC can be connected to I²C buses. An I²C bus is a multi-master, multi-slave, single-ended, serial computer bus. The function board can include integrated circuits that serve as slave devices to the BMC. The middle plane can include cable connections. The cable connections can be configured to connect the I²C buses connected to the BMC and the integrated circuits. The integrated circuits can have unique system addresses that are identifiable by the BMC. In this way, the BMC can be configured to authenticate the cable connection.

FIG. 1A illustrates a simplified perspective view of a network system 10. The network system 10 can include a motherboard 20, a middle plane 30, and a function board 40. The function board 40 can include a port 45 configured to receive cabling from the motherboard 20. The function board 40 can include an integrated circuit (IC) 47. The function board 40 can also include a signal line 43 to connect the port 45 to the IC 47. The motherboard 20 can house a baseboard management controller (BMC) 25. The motherboard 20 can also include a port 23 configured to receive cabling connecting the motherboard 20 to the function board 40. The motherboard 20 can include a signal line 27 that connects the BMC 25 to the port 23. The signal line 27 can include an I²C bus 21. The network system 10 also includes a middle plane 30 connecting the motherboard 20 to the function board 40. The middle plane 30 can also house the cabling 38 connecting the port 23 of the motherboard 20 to the port 45 of the function board 40.

Figure 1B:
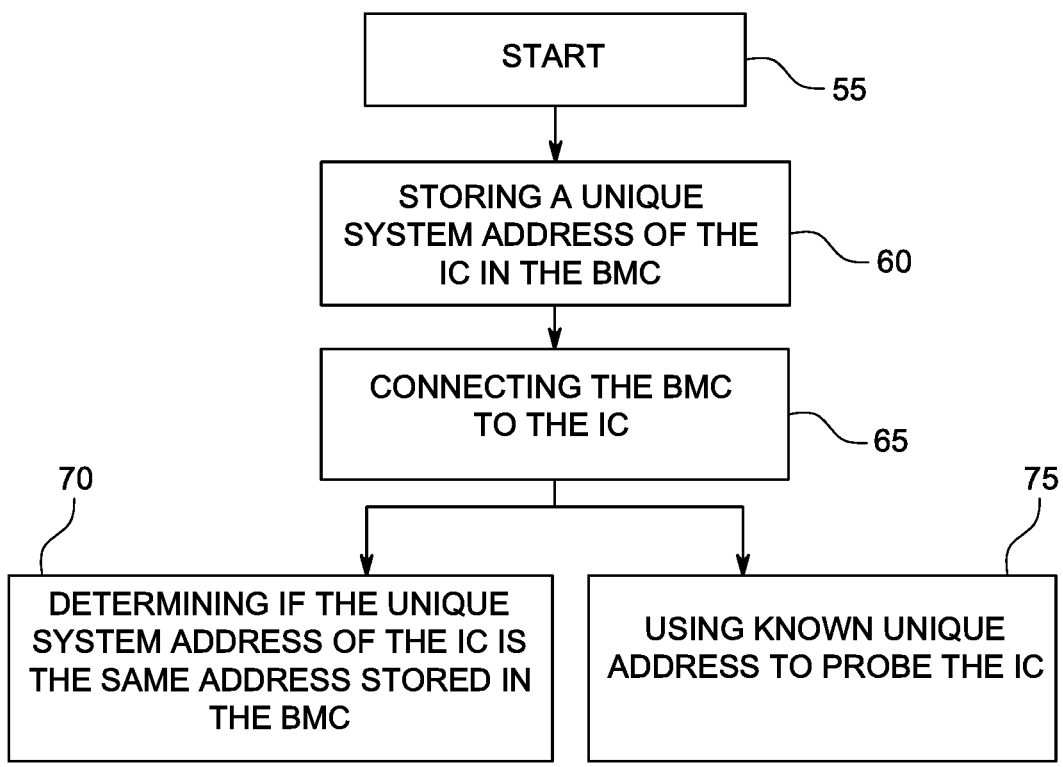
FIG. 1B shows a network system 10 in accordance with one or more embodiments of the disclosure.

FIG. 1B illustrates an exemplary methodology 50 for detecting a proper cable assembly in an effort to improve assembly and problem diagnosis. The process 50 begins at step 55, or Start. At step 60, a unique system address of the IC 47 can be stored in the BMC 25. The IC 47 can have a unique system address. The BMC 25 can be configured to store the known address of the IC 47. At step 65, the BMC 25 is linked to the IC 47. Upon connecting the cabling 38 to the port 23 of the motherboard 20 to the port 45 of the function board 40, the BMC 25 is connected to the IC 47. At step 70, the BMC 25 determines if the unique system address of the IC 47 is the same address stored in the BMC 25. Alternatively, the process 50 can advance to step 75. At step 75, the BMC 25 can use the known unique address to probe the IC 47. If the IC 47 acknowledges the BMC 25, the I²C bus 21 is connecting and the cable connection is authenticated.

The address of the IC 47 can be determined by a hardware strap pin of slave devices or software setting. The BMC 25 can use the known unique address to probe the IC 47 by sending a command with an I²C format to the IC 47. If the probing address is the same as the address for the IC 47, then the IC 47 will send the BMC 25 an ACK response. This process verifies the connection between the IC 47 and the BMC 25.

The probing process includes searching all known addresses. In some embodiments, the BMC 25 can try every address from 0000 000 to 1111 111 until it receives an ACK response from the IC 47. The address to which the BMC 25 receives an ACK response from the IC 47 is the device address of IC 47. For the purposes of this example, there is only one IC 47 device on the I²C bus 21. Therefore, the BMC 25 can stop probing after it receives the ACK response. However, in exemplary network systems that include more than one device, the BMC 25 will continue to searching all known devices until it receives ACK responses from every device. The probed address is then compared with the addresses already stored in BMC 25.

In an alternative embodiment, a known address can be used to probe the IC 47 device. For example, if IC 47 has address 0100 010 on I²C bus 21 and the signal line 43. In this embodiment, the known address 0100 010 can be used by the BMC 25 to probe the IC 47. In this case, the IC 47 will send an ACK response where the I²C bus 21 has a good connection.

The BMC 25 is able to make this determination by leveraging the I²C bus 21. The I²C bus 21 is a bi-directional two-wire serial bus that provides a communication link between IC 47 and the BMC 25. Specifically, the I²C bus 21 includes a bidirectional data (SDA) line and an unidirectional serial clock (SCL) line (not shown). This configuration allows for an open-drain, multi-drop bus, meaning that multiple devices can be hooked to the bus and communicate with one another. The bus master transmits this address in the first byte of a message to identify the recipient of the message. Thus, the BMC 25 can read the addresses of each of the IC 47 or use the known unique address which stored in BMC to probe each of the IC 47 to determine whether the cabling 38 is connected to the correct port 45.

Figure 2:
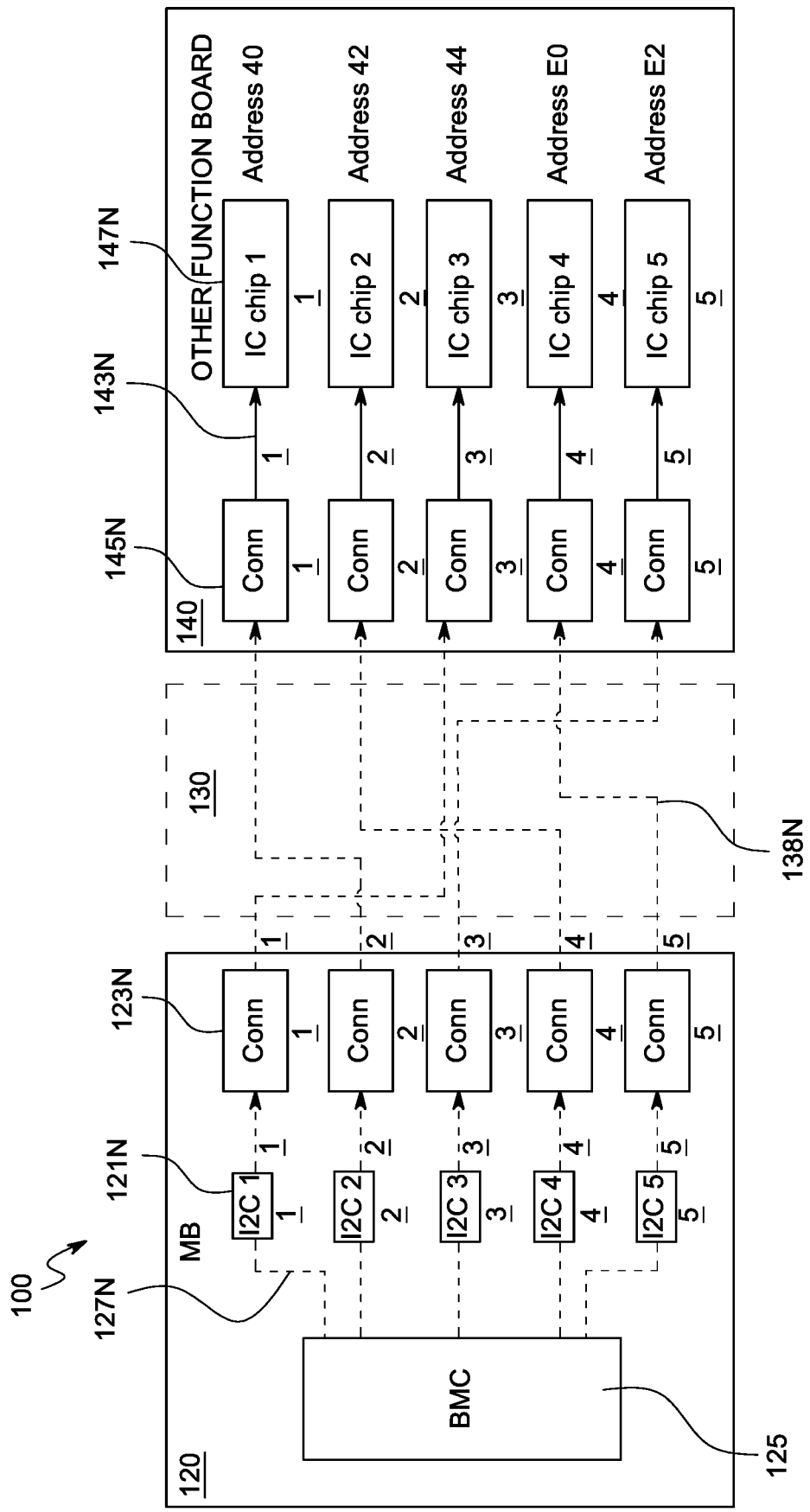
FIG. 2 shows a network system 100 in accordance with one or more embodiments of the disclosure.

FIG. 1A is a simplified version of the network system. A person of ordinary skill in the art would recognize the network system can be far more complex. For example, the network system can include multiple integrated chips, multiple I²C buses to correspond with the multiple integrated chips and so forth. FIG. 2 illustrates a perspective view of a network system 100. The network system 100 may be a server device installed in a data center. Such data centers are configured to store data and run applications accessed by remotely connected computer device users. The data centers also typically have massive numbers of servers, switches, and storage devices to store and manage data. The server device can be installed within a physical rack structure equipped with attendant power and communication connections. The racks are arranged in rows throughout the room(s) of the data center.

Similar to network system 10 in FIG. 1A, the network system 100 in FIG. 2 can include a motherboard 120, a middle plane 130, and a function board 140. The function board 140 can include ports 145N that are configured to receive cabling from the motherboard 120. The function board 140 can include integrated circuits (ICs) 147N that are configured to use an I/O channel in its native I/O mode. The function board 140 can include one or more signal lines 143N to connect the ports 145N to the ICs 147N. The signal lines 143N can be digital in, digital out, and or analog in.

The motherboard 120 can house a baseboard management controller (BMC) 125. The BMC 125 enables the motherboard 120 to effectively manage the performance of all the components within the network system 100. The motherboard 120 can also include ports 123N that are configured to receive cabling connecting the motherboard 120 to the function board 140. The motherboard 120 can include signal lines 127N that connect the BMC 125 to the ports 123N. Each of the signal lines 127N can include an I²C bus 121N. The I²C bus 121N is a bi-directional two-wire serial bus that provides a communication link between ICs 147N and the BMC 125. The I²C bus 121N can be configured in standard, fast-mode, or high-speed mode. In some embodiments, the I²C bus 121N in standard mode can operate at 100 Kbps. In some embodiments, I²C bus 121N in fast mode can operate at 400 Kbps, and I²C bus 121N in high-speed mode can support speeds up to 3.4 Mbps. Moreover, the I²C bus 121N can support 7-bit and 10-bit address space devices and devices that operate under different voltages.

The network system 100 includes a middle plane 130 connecting the motherboard 120 to the function board 140. The middle plane 130 can also house the cabling 138 connecting the ports 123N of the motherboard 120 to the ports 145N of the function board 140. In some embodiments, the middle plane 130 can be an exposed base within the network system 100. In other embodiments, the middle place 130 can include a removable section within the network system 100.

Each of the ICs 147N can have a unique system address. For example, the first IC 147N-1 can have system address 40. The second IC 147N-2 can have system address 42. The third IC 147N-3 can have system address 44. The fourth IC 147N-4 can have system address E0, and the fifth IC 147N-5 can have system address E2. The system address of the IC can be defined using a hardware strap pin or software register. The BMC 125 can store these addresses, and probe the specific IC device by its specific address. It should be understood that the network system 100 can include any number of integrated circuits. The number of integrated circuits shown herein are for exemplary purposes and not intended to be exhaustive. The BMC 125 can be configured to store the known addresses of each of the ICs 147N. Upon connecting the cabling 138 to the ports 123N of the motherboard 120 to the ports 145N of the function board 140, the BMC 125 is effectively connected to the ICs 147N.

The BMC 125 can determine if the cabling 138 is connected to the correct ports 145N of the function board 140. The BMC 125 is able to make this determination implementing the I²C bus 121N. Specifically, the I²C bus 121N includes an SDA bi-directional data line and an SCL bi-directional clock line (not shown). This configuration allows for an open-drain, multi-drop bus, meaning that multiple devices can be hooked to the bus and communicate with one another. Each device on a given I²C bus has a unique address. The bus master transmits this address in the first byte of a message to identify the recipient of the message. Thus, the BMC 125 can read the addresses of each of the ICs 147N(1-5) or use the known unique address which stored in BMC to probe each of the IC 147N to determine whether the cabling 138N(1-5) is connected to the correct port 145N.

Figure 3:
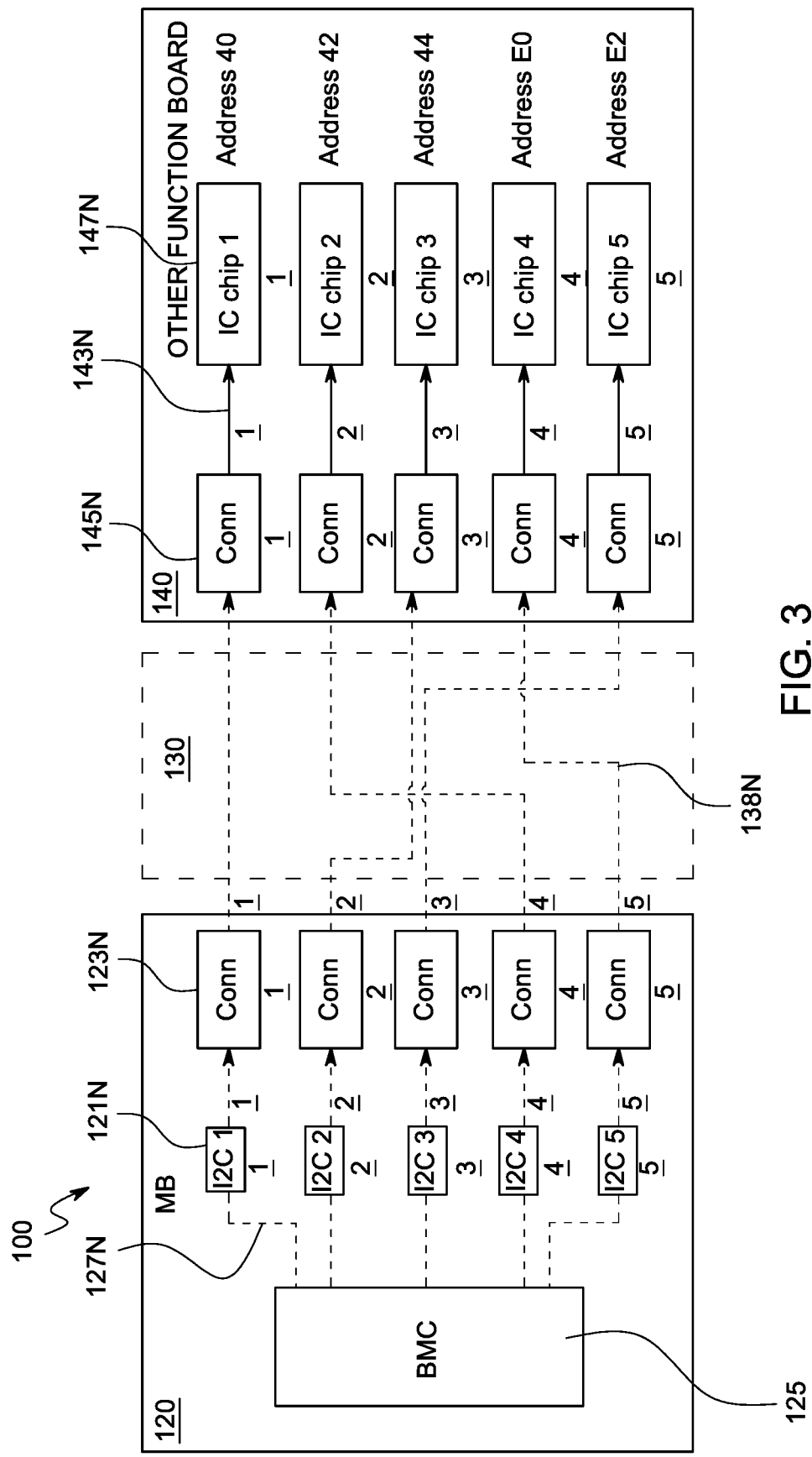
FIG. 3 shows the network system of FIG. 2, wherein the cabling is alternated in accordance with one or more embodiments of the disclosure.

FIG. 2 shows the network system 100 where the cable assembly is authenticated. For comparison purposes, FIG. 3 shows the network system 100 of FIG. 2 where the cabling is not authenticated. For example, in FIG. 2 cabling 138N(1) is connected to port 145N(3), coupling the BMC 125, I²C bus 121N(1), port 123N(1) to IC 147N(3) via port 145N(3). Similarly, in FIG. 2 cabling 138N(2) is connected to port 145N(1), coupling the BMC 125, I²C bus 121N(2), port 123N(2) to IC 147N(1) via port 145N(1). However, in FIG. 3, cabling 138N(1) is improperly connected to port 145N(1), coupling the BMC 125, I²C bus 121N(1), port 123N(1) to IC 147N(1) via port 145N(1). Upon this improper installation, the BMC 125 would recognize the system address associated with IC 147N(1) is recognizable. Alternatively, upon an improper installation the BMC 125 will probe the address associated with IC 147N(1) and will not receive a response from the IC 147N(1). Therefore, the BMC 125 would indicate to an administration the cabling is incorrect. This is the same with cabling 138N(2). Because the cabling is incorrect for both 138 (1) and 138 (2), an administrator monitoring the BMC 125 would know that the two cables should be switched.

As illustrated above, the signal lines 127N and the I²C bus 121N can directly interface with the BMC 125. In alternative embodiments, the network system 100 can include an intermediary between the signal lines 127N, the I²C bus 121N and the BMC 125.

Figure 4:
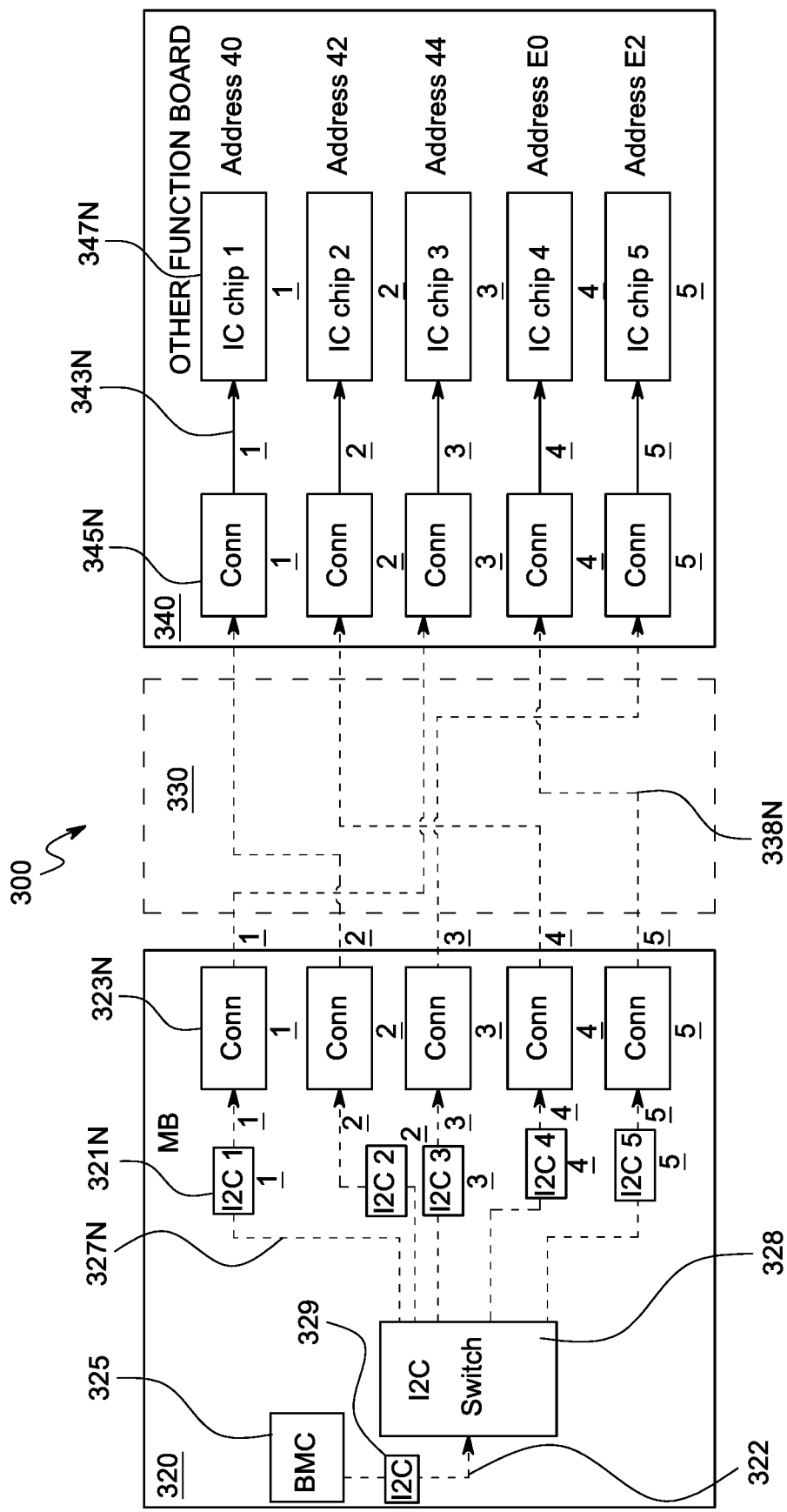
FIG. 4 shows a network system incorporating an Inter-IC switch in accordance with one or more embodiments of the disclosure.

FIG. 4 shows a network system 300 implementing a switch device. The network system 300 may be a server device installed in a data center. The network system 300 can include a motherboard 320, a middle plane 330, and a function board 340. The function board 340 can include ports 345N that are configured to receive cabling from the motherboard 320. The function board 340 can include ICs 347N that are configured to use an I/O channel in its native I/O mode. The function board 340 can include one or more signal lines 343N to connect the ports 345N to the ICs 347N. The signal lines 343N can be digital in, digital out, and or analog in.

The motherboard 320 can house a BMC 325 and an I²C switch 328. The BMC 325 can be connected to the I²C switch 328 by signal line 322. The signal line 322 can include an I²C bus 329. The BMC 325 enables the motherboard to effectively manage the performance of all the components within the network system 300. The motherboard 320 can also include ports 323N that are configured to receive cabling connecting the motherboard 320 to the function board 340.

The motherboard 320 can include signal lines 327N that connect the I²C switch 328 to the ports 323N. Each of the signal lines 327N can include an I²C 321N bus. The I²C bus 321N and the I²C bus 329 are a bi-directional two-wire serial bus that provides a communication link between ICs 347N and the BMC 325 via the I²C switch 328. The I²C switch 328 is connected to the I²C bus 321N. This allows the BMC 325 to switch between each of the I²C bus 321N(1-5) without being directly connected to each, as shown in FIG. 1.

The BMC 325 can determine if the cabling 338N is connected to the correct ports 345N of the function board 340. The BMC 325 is able to make this determination implementing the I²C bus 329 and subsequently the I²C switch 328. Specifically, the I²C bus 329 includes an SDA bi-directional data line and an SCL bi-directional clock line. This configuration allows for an open-drain, multi-drop bus, meaning that multiple devices can be hooked to the bus and communicate with one another. Each device on a given I²C bus has a unique address. The bus master transmits this address in the first byte of a message to identify the recipient of the message. Thus, the BMC 325 can read the addresses of each of the ICs 347N(1-5) or use the known unique address which stored in BMC 325 to probe each of the IC 347N via the I²C switch 328 to determine whether the cabling 338N is connected to the correct port 345N.

As illustrated above in FIGS. 2-4, a single motherboard is connected to a single function board. Furthermore, the single motherboard can house a single BMC configured to detect the validity of the cabling to the respective ICs of the function board. In some alternative embodiments, the network system can include multiple motherboards or multiple function boards, or some combination thereof.

Figure 5:
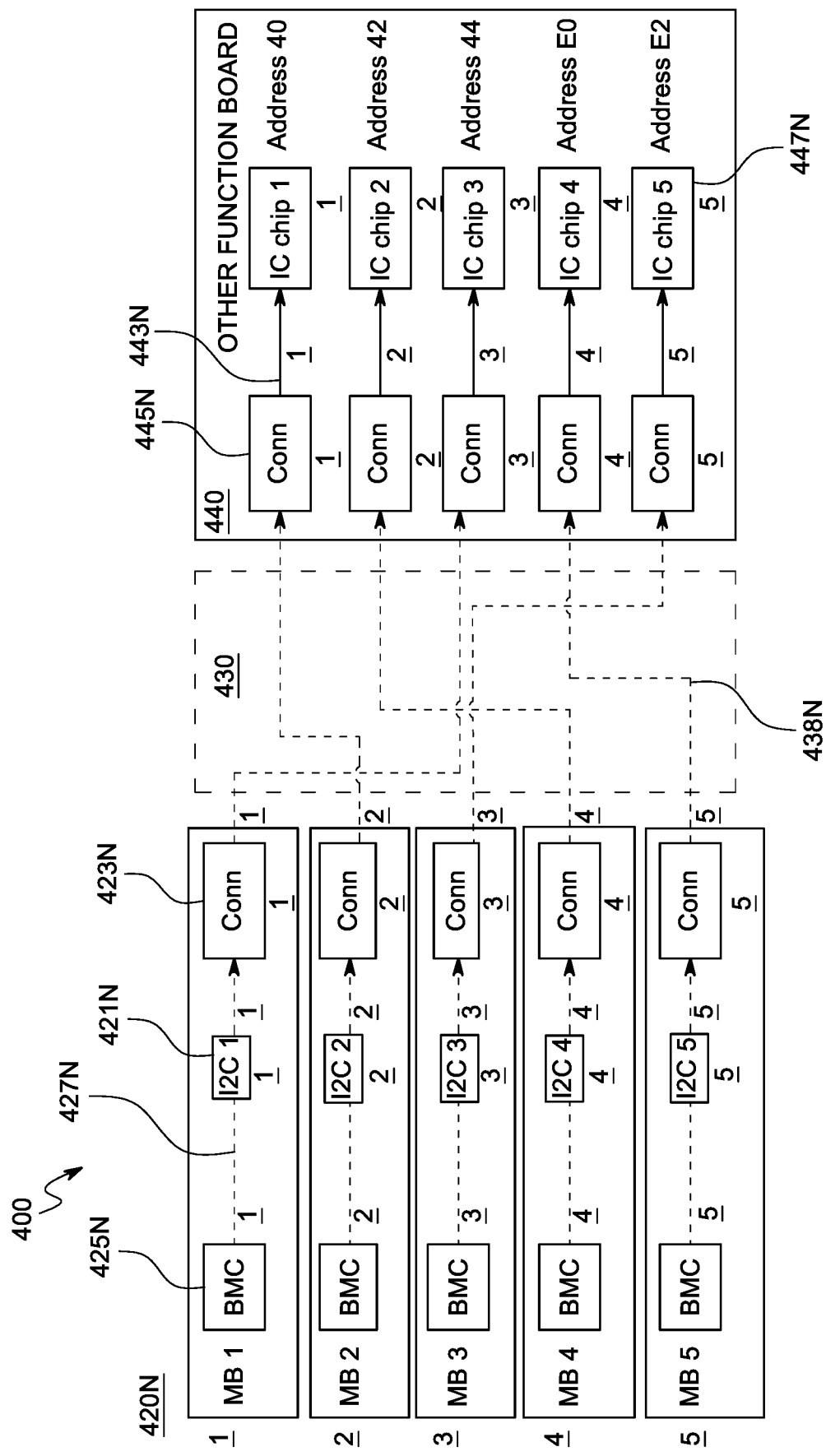
FIG. 5 shows a network system incorporating multiple motherboards and a single function board, in accordance with one or more embodiments of the disclosure.

FIG. 5 shows an exemplary network system 400 with multiple motherboards and a single function board. The network system 400 can include motherboards 420N(1-5), a middle plane 430, and a function board 440. The function board 440 can also include ports 445N that are configured to receive cabling from each of the motherboards 420N(1-5). The function board 440 can include ICs 447N that are configured to use an I/O channel in its native I/O mode. The function board 440 can include one or more signal lines 443N to connect the ports 445N to the ICs 447N. The signal lines 443N can be digital in, digital out, and or analog in.

Each of the motherboards 420N(1-5) can house a baseboard management controller (BMC) 425N. For example, motherboard 420N(1) can house BMC 425N(1); motherboard 420N(2) can house BMC 425N(2); and so on. It should be appreciated that the number of motherboards and corresponding BMCs are not meant to be exhaustive but are provide instead for exemplary purposes. The BMC 425N enables the corresponding motherboard 420N to effectively manage the performance of all the components within the network system 400. Each of the motherboards 420N(1-5) can also include a corresponding port 423N that is configured to receive cabling. The cabling can be configured to connect each of the motherboards 420N(1-5) to the function board 440. For example, motherboard 420N(1) can house port 423N(1), motherboard 420N(2) can house port 423N (2), and so on. Port 423N(1) can receive cable 438N(1) configured to connect to port 445N(3) of the function board 440.

Each of the motherboards 420N(1-5) can include a signal line 427N that connects the BMC 425N to the ports 423N. Each of the signal lines 427N can include an I²C bus 421N. For example, motherboard 420N(1) can house signal line 427N(1); motherboard 420N(2) can house signal line 427N (2); and so on. Similarly, signal line 427N(1) can include I²C bus 421N(1), and signal line 427N(2) can include I²C bus 421N(2).

Each of the I²C buses 421N(1-5) is a bi-directional two-wire serial bus that provides a communication link between ICs 447N and the corresponding BMC 425N. The network system 400 also includes a middle plane 430 connecting the motherboards 420N(1-5) to the function board 440. The middle plane 430 can also house the cabling 438N connecting the ports 423N of the corresponding motherboard 420N to the ports 445N of the function board 440.

The ICs 447N can each have a unique address. For example, the first ICS 447N-1 can have address 40. The second ICS 447N-2 can have address 42. The third ICs 447N-3 can have address 44. The fourth ICs 447N-4 can have address E0, and the fifth ICs 447N-5 can have address E2. It should be understood that the network system 400 can include any number of integrated circuits. The number of integrated circuits shown herein are for exemplary purposes and not intended to be exhaustive. Each of the BMC 425N(1-5) can be configured to store the known addresses of each of the ICs 447N(1-5). Upon connecting the cabling 438N to the ports 423N of the corresponding motherboard 420N to the ports 445N of the function board 440, the BMC 425N is effectively connected to the ICs 447N(1-5).

Each one of the BMCs 425N(1-5) can determine if the cabling 438N is connected to the correct ports 445N of the function board 440. Each one of the BMCs 425N(1-5) is able to make this determination implementing the corresponding I²C bus 421N. Specifically, the I²C bus 421N includes an SDA bi-directional data line and an SCL bi-directional clock line (not shown). This configuration allows for an open-drain, multi-drop bus, meaning that multiple devices can be hooked to the bus and communicate with one another. Each device on a given I²C bus has a unique address. The bus master transmits this address in the first byte of a message to identify the recipient of the message. Thus, each one of the BMCs 425N(1-5) can read the address of the connected ICs 447N or use the known unique address which stored in BMC to probe each of the IC 447N to determine whether the cabling 438N is connected to the correct port 445N.

Figure 6:
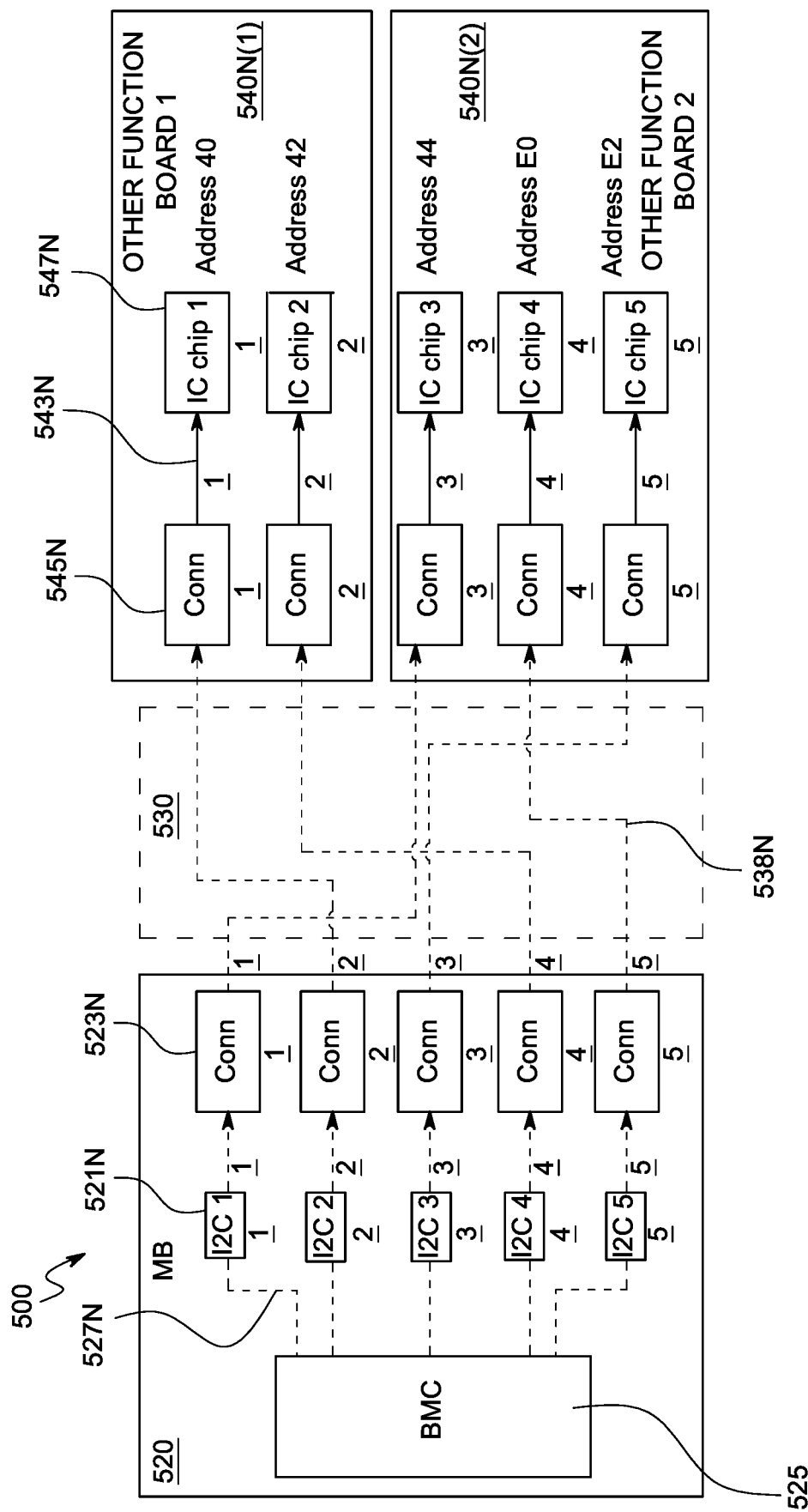
FIG. 6 shows a network system incorporating multiple function boards and a single motherboard, in accordance with one or more embodiments of the disclosure.

FIG. 6 shows an exemplary network system 500 with multiple function boards and a single motherboard. The network system 500 can include a motherboard 520, a middle plane 530, and multiple function boards 540N(1-2). Each of the function boards 540N(1-2) can serve as a hard drive, a solid state drive, or some combination thereof. The function board 540N(1) can include ports 545N(1-2) that are configured to receive cabling from the motherboard 520. Similarly, the function board 540N(2) can include ports 545N(3-5) that are configured to receive cabling from the motherboard 520.

The function board 540N(1) can include ICs 547N(1-2) that are configured to use an I/O channel in its native I/O mode. Similarly, the function board 540N(2) can include ICs 547N(3-5) that are configured to use an I/O channel in its native I/O mode. The function board 540N(1) can include signal lines 543N(1-2) to connect the ports 545N to the ICs 547N(1-2). Similarly, function board 540N(2) can include signal lines 543N(3-5) to connect the ports 545N to the ICs 547N(3-5). The signal lines 543N can be digital in, digital out, and or analog in.

The motherboard 520 can house a baseboard management controller (BMC) 525. The BMC 525 enables the motherboard 520 to effectively manage the performance of all the components within the network system 500. The motherboard 520 can also include ports 523N that are configured to receive cabling connecting the motherboard 520 to the function boards 540N. The motherboard 520 can include signal lines 527N that connect the BMC 525 to the ports 523N. Each of the signal lines 527N can include an I²C bus 521N. The I²C bus 521N is a bi-directional two-wire serial bus that provides a communication link between ICs 547N and the BMC 525. The network system 500 also includes a middle plane 530 connecting the motherboard 520 to the function boards 540N. The middle plane 530 can also house the cabling 538N connecting the ports 523N of the motherboard 520 to the ports 545N of the function boards 540N.

The ICs 547N can each have a unique address. For example, the first ICs 547N-1 can have address 40. The second ICs 547N-2 can have address 42. The third ICs 547N-3 can have address 44. The fourth ICs 547N-4 can have address E0, and the fifth ICs 547N-5 can have address E2. It should be understood that the network system 500 can include any number of integrated circuits and any number of function boards. The number of integrated circuits and function boards shown herein are for exemplary purposes and not intended to be exhaustive. The BMC 525 can be configured to store the known addresses of each of the ICs 547N(1-5). Upon connecting the cabling 538N to the ports 523N of the motherboard 520 to the ports 545N of the function boards 540N, the BMC 525 is effectively connected to each of the ICs 547N(1-5).

The BMC 525 can determine if the cabling 538N is connected to the correct ports 545N of the function board 540. The BMC 525 is able to make this determination implementing the I²C bus 521N. Specifically, the I²C bus 521N includes an SDA bi-directional data line and an SCL bi-directional clock line. This configuration allows for an open-drain, multi-drop bus, meaning that multiple devices can be hooked to the bus and communicate with one another. Each device on a given I²C bus has a unique address. The bus master transmits this address in the first byte of a message to identify the recipient of the message. Thus, the BMC 525 can read the addresses of each of the ICs 547N (1-5) or use the known unique address which stored in BMC 525 to probe each of the IC 547N to determine whether the cabling 538N N is connected to the correct port 545N.

While various embodiments of the present invention have been described above, it should be understood that they have been presented by way of example only, and not limitation. Numerous changes to the disclosed embodiments can be made in accordance with this disclosure without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations, and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to limit the invention. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A computing device, comprising:
   at least one motherboard comprising at least one baseboard management controller (BMC) and a plurality of I²C buses connected to the BMC;
   at least one function board comprising a plurality of integrated circuits; and
   a middle plane comprising a plurality of cable connections configured to receive a plurality of cables connected to respective I²C buses and plurality of to respective integrated circuits, wherein each integrated circuit of the plurality of integrated circuits comprises a unique address,
   wherein the BMC is configured to:
      store a corresponding address of a first integrated circuit of the plurality of integrated circuits;
      receive a unique address from the first integrated circuit of the plurality of integrated circuits via a first I²C bus upon becoming communicatively coupled to the BMC via the cabling; and
      verifying the received unique address of the first integrated circuit in view of the corresponding address of the first integrated circuit stored in the BMC to determine if the first integrated circuit is an intended integrated circuit.

2. The computing device of claim 1, further comprising signal lines connecting the BMC to the plurality of I²C buses.

3. The computing device of claim 1, wherein each of the plurality of integrated circuits comprises a unique address, identifiable by the BMC via the plurality of I²C buses.

4. The computing device of claim 1, wherein BMC and the plurality of I²C buses are connected via an I²C switch.

5. The computing device of claim 4, further comprising a main I²C bus connecting the BMC and I²C switch.

6. The computing device of claim 1, wherein each of the plurality of integrated circuits comprises a unique address, identifiable by the BMC via the main I²C bus.

7. A computing device, comprising:
   a plurality of motherboards, each motherboard comprising at least one baseboard management controller (BMC) and at least one I²C bus connected to the at least one BMC;

at least one function board comprising a plurality of integrated circuits, wherein each integrated circuit of the plurality of integrated circuits comprises a unique address; and a middle plane comprising a plurality of cable connections configured to receive a plurality of cables connected to respective I²C buses and to respective integrated circuits, wherein each BMC is configured to:
    store a corresponding address of a first integrated circuit of the plurality of integrated circuits;
    receive a unique address from the first integrated circuit of the plurality of integrated circuits via a first I²C bus upon becoming communicatively coupled to the BMC via the cabling; and
    verifying the received unique address of the first integrated circuit in view of the corresponding address of the first integrated circuit stored in the BMC to determine if the first integrated circuit is an intended integrated circuit.

8. The computing device of claim 7, further comprising at least one signal line connecting the at least one BMC to the plurality of I²C buses.

9. The computing device of claim 7, wherein each of the plurality of integrated circuits comprises a unique address, identifiable by the at least one BMC via the at least one I²C bus.

10. A computing device, comprising:
at least one motherboard comprising at least one baseboard management controller (BMC) and a plurality of I²C buses connected to the BMC;
a plurality of function boards, wherein each of the plurality of function boards comprises a plurality of integrated circuits; and
a middle plane comprising a plurality of cable connections configured to receive a plurality of cables connected to respective I²C buses and to respective integrated circuits, wherein each integrated circuit of the plurality of integrated circuits comprises a unique address, wherein each BMC is configured to:
    store a corresponding address of a first integrated circuit of the plurality of integrated circuits;
    receive a unique address from the first integrated circuit of the plurality of integrated circuits via a first I²C bus upon becoming communicatively coupled to the BMC via the cabling; and
    verifying the received unique address of the first integrated circuit in view of the corresponding address of the first integrated circuit stored in the BMC to determine if the first integrated circuit is an intended integrated circuit.

11. The computing device of claim 10, further comprising signal lines connecting the BMC to the plurality of I²C buses.

12. The computing device of claim 10, wherein each of the plurality of integrated circuits comprises a unique address, identifiable by the BMC via the plurality of I²C buses.

13. The computing device of claim 10, wherein BMC and the plurality of I²C buses are connected via an I²C switch.

14. The computing device of claim 13, further comprising a main I²C bus connecting the BMC and I²C switch.

15. The computing device of claim 10, wherein each of the plurality of integrated circuits comprises a unique address, identifiable by the BMC via the main I²C bus.

\* \* \* \* \*